*L. White,*
*Stone Drill.*

Nº 24,421. Patented June 14, 1859.

Witnesses.
J. W. McRown
Henry Hills

Inventor
Lyman White

UNITED STATES PATENT OFFICE.

LYMAN WHITE, OF DAVENPORT, IOWA.

ROCK-DRILL.

Specification of Letters Patent No. 24,421, dated June 14, 1859.

*To all whom it may concern:*

Be it known that I, LYMAN WHITE, of Davenport, in the county of Scott and State of Iowa, have invented a new and Improved Rock-Drill; and I do hereby declare that the following is a full, clear, and exact description of the same, reference being had to the annexed drawings, making a part of this specification, in which—

Figure 1:
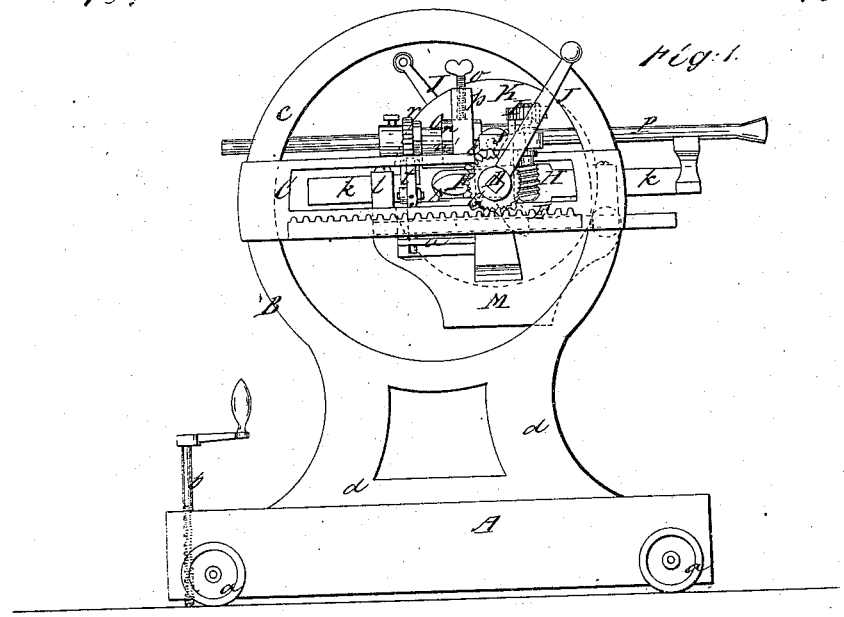
Figure 3:
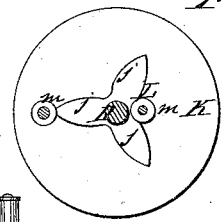
Figure 2:
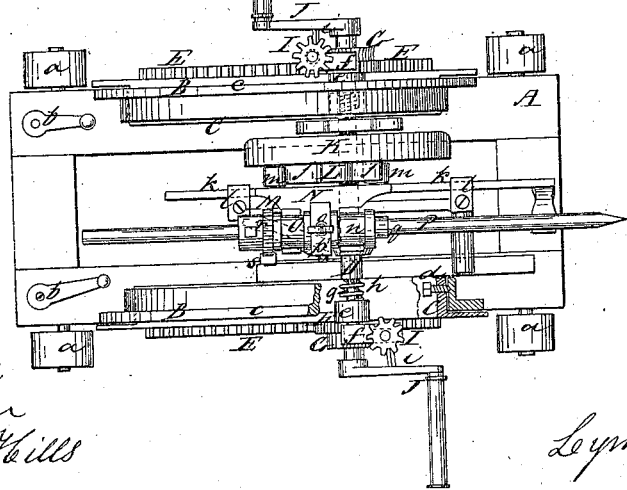

Figure 1, is a side elevation of my invention. Fig. 2, is a plan or top view of the same, a portion being bisected. Fig. 3, is a detached face view of one of the cams of the same.

Similar letters of reference indicate corresponding parts in the several figures.

To enable others skilled in the art to fully understand and construct my invention, I will proceed to describe it.

A, represents a horizontal frame which is mounted on rollers $a$, and which may be adjusted by vertical screw rods $b$, which pass vertically through the back part of the frame A. To each side of the frame A, an upright supporting piece B, is secured. These supporting pieces are each formed of an annular top piece $c$, and lower supports and base $d$, $d$, the whole being cast in one piece, that is to say, the part or piece at each side of the framing. Within each annular portion $c$, of the supports B, a bar C, is placed and secured by screws $d'$. The bars C, are equal in diameter to the annular portions $c$, and when not secured by the screws $d'$, may be turned within $c$, to any desired angle or position. The bars C, C, are slotted longitudinally nearly their whole length, and a box or bearing $e$, is fitted in each bar and allowed to slide therein.

D, is a shaft, the journals of which are fitted in the boxes or bearings $e$, and allowed to turn freely therein.

On the outer side of each bar C, there is a longitudinal rack E, and into these racks wheels F, gear, one wheel into each rack. The wheels F, are placed loosely on the shaft D; and to the outer side of each wheel F, a worm wheel G, is attached into each of which a screw H, gears. The screws H, have their bearings in bars $f$, which are secured by journals $g$, to the upper parts of the boxes $e$, and have springs $h$, acting upon them to keep the screws H, in gear with the worm wheels G. On the upper end of each screw H, a toothed wheel I, is secured.

On each end of the shaft D, a crank J, is placed and from the inner side of each crank a pin $i$, projects, as shown clearly in Fig. 2.

On the shaft D, a wheel or disk K, is placed and permanently secured. This disk has a cam L, attached to its face side. The cam is formed of three radial projections $j$, $j$, $j$, of pointed form, as shown clearly in Fig. 3.

On the shaft D, a box M, is suspended, and on this box a carriage N, is placed, said carriage being supported by bars $k$, $k$, which are fitted in guides $l$, $l$, on the box M. The bars $k$, $k$, are allowed to slide freely in the guides $l$, $l$. To one side of the carriage N, two friction rollers $m$, $m$, are attached, between which the cam L, works; see Figs. 2 and 3. On the upper part of the carriage N, a socket O, is placed. This socket is formed of two longitudinal parts $n$, $n'$, the upper one $n$, being secured to the lower one $n'$, by a screw $o$, which passes through a yoke $p$, on the upper part of the carriage N. In the socket O, a drill P, is placed and secured in proper position by a collar $q$, and the hub of a ratchet $r$, the collar $q$, being at one end of the socket, and the ratchet at the other, as shown clearly in Fig. 2. Into the ratchet $r$, a pawl $s$, gears, said pawl being attached to a lever $t$, on the carriage, the lower end of which lever is fitted in an oblique slot in a projection $u$, on box M.

The operation is as follows:—The bars C, C, are adjusted in the annular parts $c$, $c$, of the supports B, according to the direction in which the drill P, is to work, and the boxes or bearings $e$, $e$, are adjusted in the back parts of the bars C, C. The machine is then moved so that the drill P, will be in contact with the rock to be bored, and the shaft D, is rotated through the medium of the cranks J, J. The cam L, gives a reciprocating motion to the carriage N, and drill P, both the percussive and return movements of the latter being arbitrary or positive. At every revolution of the cranks J, J, the drill is fed to its work in consequence of the pins $i$, on the cranks actuating the wheels I, and thereby turning the screws H, which turn the wheels G, F, the wheels F, in consequence of gearing into the racks E, moving forward the bearings $e$, in the bars C, C, and consequently also moving forward the drill P, to its work. At every backward movement of the drill it is turned a certain distance in consequence of the lever $t$, being actuated by the oblique slot in the projection $u$ on box M.

From the above description it will be seen that the machine or device may be readily adjusted so that the drill may operate at any angle. The machine is also rendered very compact, and the arrangement of parts is simple and not liable to become deranged by use.

Having thus described my invention what I claim as new and desire to secure by Letters Patent is—

1. Placing the bearings $e$, of the shaft D, to which the box M, and drill carriage N, are attached, in bars C, C, which are fitted in annular parts $c$, of the supports B, and arranged substantially as shown so as to admit of the facile adjustment of the drill P, to any angle or position required.

2. The employment or use of the racks E, on the bars C, C, in connection with the wheels F, G, on the shaft D, the screws H, attached to the sliding bearings $e$, by the bars $f$, the wheels I, on the upper ends of the screws H, and the pins $i$, on the cranks J, the whole being arranged substantially as shown to feed the drill to its work.

LYMAN WHITE.

Witnesses:
 D. N. McKown,
 Henry Hills.